(12) United States Patent
Okamura

(10) Patent No.: US 7,697,649 B2
(45) Date of Patent: Apr. 13, 2010

(54) CIRCUIT FOR MEASURING AN EYE SIZE OF DATA, AND METHOD OF MEASURING THE EYE SIZE OF DATA

(75) Inventor: Hitoshi Okamura, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 858 days.

(21) Appl. No.: 11/505,054

(22) Filed: Aug. 16, 2006

(65) Prior Publication Data

US 2007/0047680 A1  Mar. 1, 2007

(30) Foreign Application Priority Data

Aug. 24, 2005  (KR) .................... 10-2005-0077834

(51) Int. Cl.
*H04L 7/00* (2006.01)
(52) U.S. Cl. ...................................... 375/355; 375/376
(58) Field of Classification Search ................ 375/354, 375/355, 373, 376, 327, 294
See application file for complete search history.

(56) References Cited

U.S. PATENT DOCUMENTS

| | | | |
|---|---|---|---|
| 6,266,799 B1 | 7/2001 | Lee et al. | |
| 6,731,683 B1 | 5/2004 | Fiedler et al. | |
| 6,738,922 B1* | 5/2004 | Warwar et al. .............. | 713/503 |
| 6,757,327 B1 | 6/2004 | Fiedler | |
| 2003/0011847 A1* | 1/2003 | Dai et al. ..................... | 359/161 |
| 2005/0238093 A1* | 10/2005 | Payne et al. .................. | 375/224 |
| 2005/0259726 A1* | 11/2005 | Farjad-rad .................... | 375/232 |
| 2005/0259764 A1* | 11/2005 | Hung Lai et al. ............. | 375/317 |
| 2005/0259774 A1* | 11/2005 | Garlepp ....................... | 375/355 |
| 2006/0034358 A1 | 2/2006 | Okamura | |

(Continued)

FOREIGN PATENT DOCUMENTS

EP  1193931  4/2002

(Continued)

OTHER PUBLICATIONS

Jared L. Zerbe, et al, Member IEEE, "Equalization and Clock Recovery for a 2.5-10-Gb/s 2-PAM/4-PAM Backplane Transceiver Cell" IEEE Journal of Solid-State Circuits, vol. 38, No. 12, Dec. 2003, pp. 2121-2130.

(Continued)

*Primary Examiner*—Emmanuel Bayard
(74) *Attorney, Agent, or Firm*—F. Chau & Associates, LLC

(57) ABSTRACT

A circuit for measuring an eye size generates first sampled data by sampling received data with recovered clock signals and generates second sampled data by sampling the received data with shifted clock signals, in which the recovered clock signals, having different phases, are recovered from the received data. The shifted clock signals are obtained by shifting each phase of at least one of recovered clock signals by respectively predetermined phases. The circuit generates error counts for calculating the eye size of the received data by comparing the first sampled data and the second sampled data and measures the eye size by obtaining a phase range where the error counts are equal to zero. Therefore, the circuit may measure the eye size without interference of frequency offsets and/or jitter of the received data.

27 Claims, 18 Drawing Sheets

U.S. PATENT DOCUMENTS

2006/0140321 A1* 6/2006 Tell et al. ................... 375/376
2008/0240219 A1* 10/2008 Chen ......................... 375/229

FOREIGN PATENT DOCUMENTS

EP      1199821      4/2002
JP      2003-169099  6/2003

OTHER PUBLICATIONS

Tobias Ellermeyer, et al, "A 10-Gb/s Eye-Opening Monitor IC for Decision-Guided Adaptation of the Frequency Response of an Optical Receiver" IEEE Journal of Solid-State Circuits, vol. 35, No. 12, Dec. 2000, pp. 1958-1963.

* cited by examiner

FIG. 9

| CODE | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ERROR COUNT | 32 | 21 | 4 | 0 | 0 | 0 | 0 | 0 | 0 | 0 | 0 | 0 | 0 | 6 | 19 | 32 |

EYE SIZE

FIG. 10

| EQ CONTROL BIT | DIGITAL CODE | ERROR COUNT | EYE SIZE |
|---|---|---|---|
| 0 0 | 0<br>1<br>2<br>3<br>4<br>5<br>6<br>7<br>8<br>9<br>10<br>⋮<br>15 | 10<br>6<br>0<br>0<br>0<br>0<br>0 } 8<br>0<br>0<br>0<br>0<br>4<br>⋮<br>19 | 8 |
| 0 1 | 0<br>1<br>2<br>3<br>⋮<br>⋮<br>14<br>15 | 14<br>9<br>0<br>0 } 14<br>⋮<br>0<br>6 | 14 |
| 1 0 | 0<br>1<br>2<br>3<br>⋮<br>⋮<br>13<br>14<br>15 | 12<br>10<br>8<br>0<br>⋮ } 12<br>⋮<br>0<br>5<br>9 | 12 |
| 1 1 | 0<br>1<br>2<br>3<br>4<br>5<br>6<br>⋮<br>10<br>11<br>⋮<br>⋮ | 13<br>10<br>9<br>7<br>5<br>5<br>0<br>⋮ } 6<br>0<br>6<br>⋮<br>⋮ | 6 |

CIRCUIT FOR MEASURING AN EYE SIZE OF DATA, AND METHOD OF MEASURING THE EYE SIZE OF DATA

CROSS-REFERENCE TO RELATED APPLICATIONS

This application claims priority under 35 U.S.C. §119(a) of Korean Patent Application No. 2005-77834 filed on Aug. 24, 2005, the contents of which are herein incorporated by reference in its entirety

BACKGROUND OF THE INVENTION

1. Technical Field

The present disclosure relates to a serial data receiver of a data communication system, and more particularly to a circuit and a method of measuring eye size of serial data in a serial data receiver of a data communication system.

2. Discussion of the Related Art

A serializer-deserializer in a data communication system serializes data so as to transfer the serialized data via transmission lines, such as a printed line, and deserializes serialized data that is received.

Typically, the serializer-deserializer includes a preamplifier, an equalizer, a sampler, and a clock data recovery (CDR) circuit.

The serializer-deserializer recovers a frequency of the serialized data in the CDR circuit and supplies a clock signal with the recovered frequency to the sampler. Therefore, the receiver can receive the serialized data even though a transmitter operates and transmits the serialized data with a clock signal having a different frequency from that of a reference clock used in the receiver.

When data are transmitted at a high speed via a transmission line, such as a printed line, inter-symbol interference (ISI) may occur due to the properties of the transmission line. The amplitude and phase of the received data signal can be seriously distorted by the inter-symbol interference, and the distorted amplitude and phase may cause bit errors in the receiver. Thus, as the length of the transmission line becomes longer and the data transmission rate becomes higher, the distortion of the received signal increases.

Since the serializer-deserializer is a kind of a serial interface, the received serial data may include a high degree of jitter. Therefore, when flip-flops or latches used in the sampler receive the data, the eye size of the data is critical to the performance of the device or the entire system.

The preamplifier in the serializer-deserializer amplifies a voltage level of the received data and the equalizer in the serializer-deserializer executes an equalization of the received data to reduce jitter, specifically ISI, in the received data, and then outputs the equalized signal to the sampler.

The equalizer is provided with a control bit to adjust an equalizing strength, based on the jitter properties of the received data. The equalizer can control the equalization function based on the jitter properties. A relatively small eye size of the received data indicates that the equalization is inadequate, and then the equalizer strengthens the equalization. On the contrary, a relatively large eye size of the received data indicates that the equalization is excessive, and the equalizer weakens the equalization so as to obtain an optimized eye size.

The conventional serializer-deserializer uses a decision feedback circuit to detect a variation of the eye size of the signal, instead of directly measuring the eye size of signal at an output node of the equalizer.

SUMMARY OF THE INVENTION

Exemplary embodiments of the present invention provide a circuit for measuring an eye size of a data signal directly at an output terminal of an equalizer in a receiver of a data communication system.

Exemplary embodiments of the present invention provide a receiver of a data communication system including a circuit for measuring an eye size of the data signal.

Exemplary embodiments of the present invention provide a method of measuring an eye size of a data signal directly at an output terminal of an equalizer in the receiver of a data communication system.

In exemplary embodiments of the present invention, a circuit for measuring an eye size includes a sampler and an error counter. The sampler generates first sampled data by sampling received data based on at least one shifted clock signal, in which the at least one shifted clock signal is obtained by shifting each phase of at least one of recovered clock signals by respectively predetermined phases, and the recovered clock signals have phases that are different from each other and that are recovered from the received data. The error counter generates an error count used for calculating the eye size of the received data by comparing the first sampled data with second sampled data, in which the second sampled data are obtained by sampling the received data based on the at least one of the recovered clock signals.

In exemplary embodiments of the present invention, a circuit for measuring an eye size includes: a sampler configured to generate first sampled data by sampling received data based on at least one shifted clock signal, the at least one shifted clock signal being obtained by shifting each phase of at least one of a plurality of clock signals by respectively predetermined phases, and the plurality of the clock signals having different phases from each other; and an error counter configured to generate an error count for calculating the eye size of the received data by comparing the first sampled data with second sampled data, the second sampled data being obtained by sampling the received data based on at least one of recovered clock signals, the recovered clock signals having different phases and being recovered from the received data.

In exemplary embodiments of the present invention, a receiver of a data communication system includes: a clock data recovery (CDR) circuit for generating a plurality of recovered clock signals, the recovered clock signals having different respective phases and being recovered from received data; a first sampler configured to generate first sampled data by sampling the received data based on at least one of the recovered clock signals; and an eye size measuring circuit configured to measure an eye size of the data by comparing the first sampled data with second sampled data, the second sampled data being obtained by sampling the received data based on at least one of the shifted clock signals, the at least one shifted clock signal being obtained by shifting each phase of the at least one of the recovered clock signals by respectively predetermined phases.

In exemplary embodiments of the present invention, a receiver of a data communication system includes a clock data recovery circuit for generating a plurality of recovered clock signals, the recovered clock signals having different respective phases and being recovered from received data; a first sampler configured to generate first sampled data by sampling the received data based on at least one of the recovered clock signals; and an eye size measuring circuit configured to measure an eye size of the data by comparing the first sampled data with second sampled data, the second sampled data being obtained by sampling the received data based on at least one shifted clock signal, the at least one shifted clock signal being obtained by shifting each phase of at least one of a plurality of clock signals by respectively predetermined respective phases.

In exemplary embodiments of the present invention, a method of measuring an eye size of the data includes: generating first sampled data by sampling received data based on at least one of recovered clock signals, the recovered clock signals having different respective phases and being recovered from the received data; shifting each phase of at least one of the recovered clock signals by respectively predetermined phases to generate at least one shifted clock signal; generating second sampled data by sampling the received data based on the at least one shifted clock signal; and generating an error count for calculating the eye size of the received data by comparing the first sampled data with the second sampled data.

In exemplary embodiments of the present invention, a method of measuring an eye size of received data includes: generating first sampled data by sampling received data based on at least one of recovered clock signals, the recovered clock signals having different phases and being recovered from the received data; shifting each phase of at least one of a plurality of clock signals having different phases by respectively predetermined phases to generate at least one shifted clock signal; generating second sampled data by sampling the received data based on the at least one shifted clock signal; and generating an error count for calculating the eye size of the received data by comparing the first sampled data with the second sampled data.

Therefore, the eye size of received data may be measured without interference of frequency offsets and/or jitter of the received data.

BRIEF DESCRIPTION OF THE DRAWINGS

Exemplary embodiments of the present invention will be understood in more detail from the following descriptions taken in conjunction with the accompanying drawings, in which:

FIG. 9 is a table illustrating a relationship between the error count and the digital code for shifting a recovered clock signal;

FIG. 10 is an illustration of the relationship among the digital code for shifting a recovered clock signal, the error count, the eye size, and the equalizer control bit;

DETAILED DESCRIPTION OF EXEMPLARY EMBODIMENTS

Figure 1:
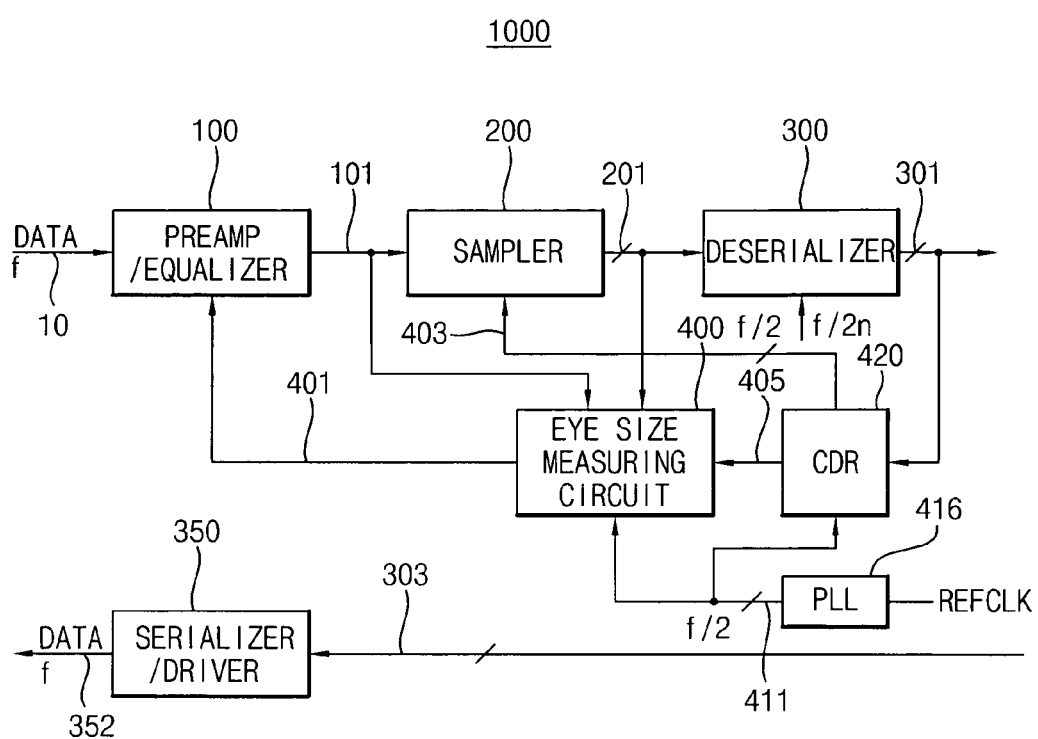
FIG. 1 is a block diagram illustrating a receiver of a data communication system including a serializer-deserializer according to an exemplary embodiment of the invention.

FIG. 1 is a block diagram illustrating a receiver 1000 of a data communication system including a serializer-deserializer according to an exemplary embodiment of the present invention.

Referring to FIG. 1, the receiver 1000 includes a preamplifier/equalizer 100, a first sampler 200, a deserializer 300, a clock data recovery (CDR) circuit 420, a phase locked loop (PLL) 416, an eye size measuring circuit 400 and a serializer/output-driver 350.

The preamplifier/equalizer 100 compensates the amplitude and delay proportions of a received data signal 10 of a serial data stream received from a transmission line (not shown) and outputs compensated data 101 to the first sampler 200. More specifically, the preamplifier/equalizer 100 receives the serial data stream via the transmission line, amplifies the voltage level of the received data signal 10, and then compensates the received data signal 10 for jitter or distortion caused by inter-symbol interference with equalization of the amplified data. The preamplifier/equalizer 100 adjusts the equalizing strength based on a control bit 401 fed thereto.

The first sampler 200 samples the compensated data 101 from the preamplifier/equalizer 100 with a plurality of recovered clock signals (I, Q, Ib, and Qb) 403, which are recovered from the received data 10 by the CDR circuit 420, so as to output sampled data 201.

The deserializer 300 converts the sampled data 201 that is in a serial form, which were sampled from the received data signal 10 by the first sampler 200, into deserialized data 301 in parallel form with a conversion ratio of 1:n, that is, one parallel data word is composed of n serial bits.

The CDR circuit 420 extracts the recovered clock signals (I, Q, Ib, and Qb) 403 that were fed to the sampler 200 based on the deserialized data 301 output from the deserializer 300 using multiple reference clocks 411 from the PLL 416.

Figure 2:
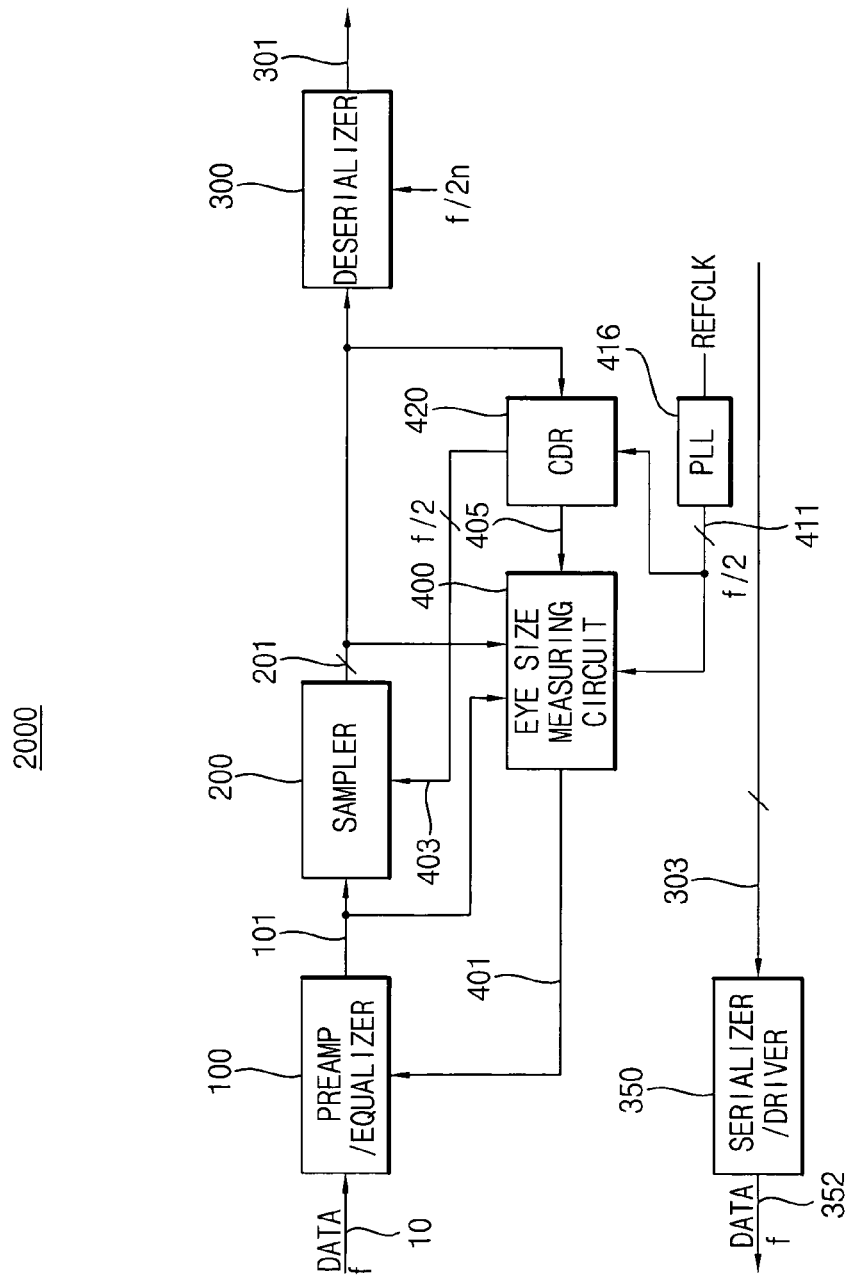
FIG. 2 is a block diagram illustrating a receiver of a data communication system including a serializer-deserializer according to an exemplary embodiment of the invention.

The CDR circuit 420, according to an exemplary embodiment of the present invention shown in FIG. 2, can extract the recovered clock signals 403, which are recovered from the received data 10, based on the sampled data 201 from the first sampler 200 instead of the deserialized data 301 from the deserializer 300 in FIG. 1.

The eye size measuring circuit 400 counts the number of errors based on a comparison result between sampled data, which are sampled from the amplified data 101 of the preamplifier/equalizer 100 by shifted clock signals (Q' and Qb') and the sampled data 201 from the first sampler 200. The eye size measuring circuit 400 calculates an eye size of the received data 10 based on the number of errors. The eye size measuring circuit 400 also generates the control bit 401 used to adjust the equalizing strength of the preamplifier/equalizer 100 that is provided to the preamplifier/equalizer 100.

The serializer/output-driver 350 serializes the data 303, which has been processed by another functional block (not shown) based on the output 301 from the deserializer unit 300, and transmits the serialized data via a transmission line (not shown). The serialized data may be amplified before being transmitted by the serializer/output-driver 350.

Figure 3:
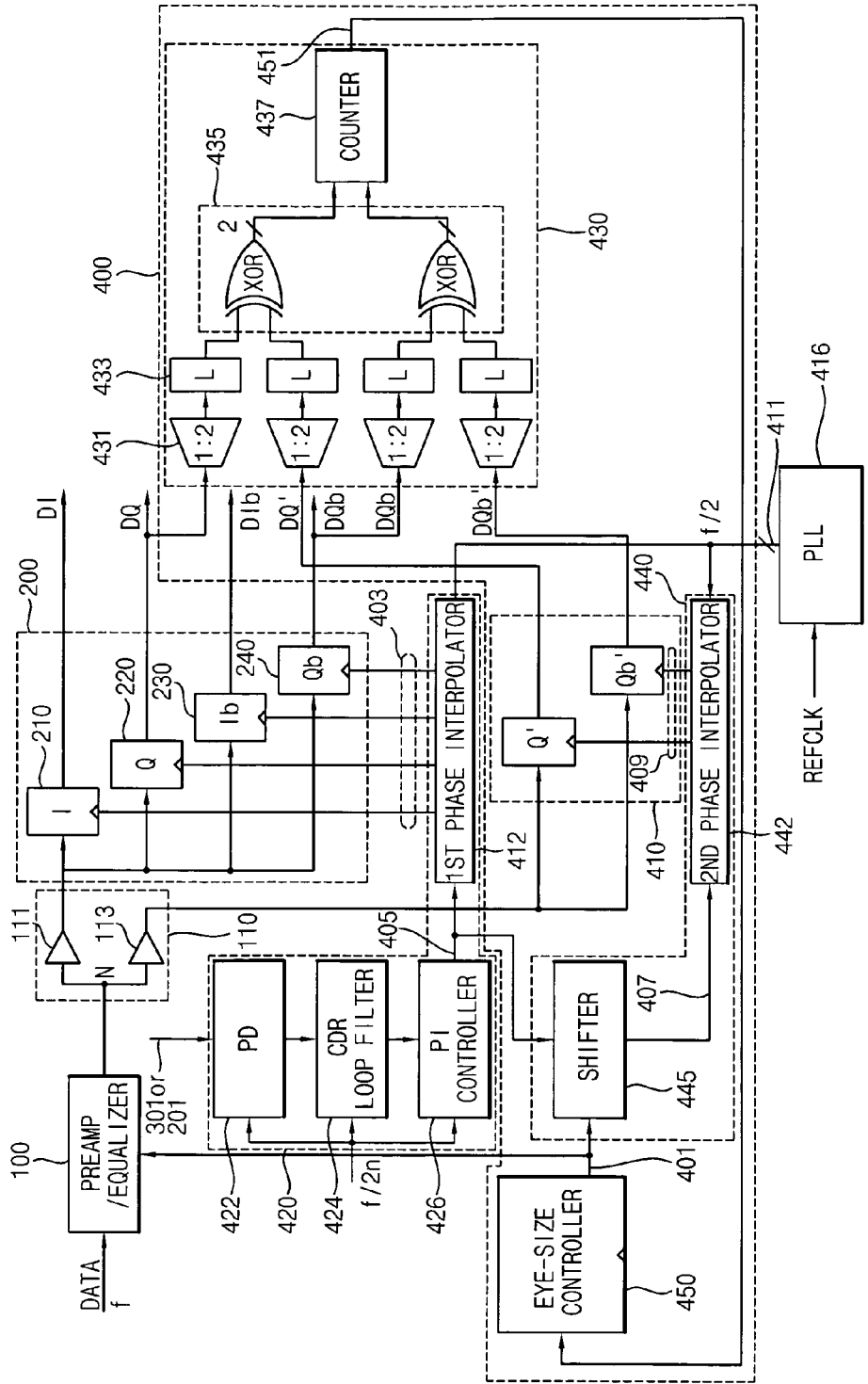
FIG. 3 is a detailed block diagram illustrating the receiver including an eye size measuring circuit in FIG. 1 according to an exemplary embodiment of the invention.

FIG. 3 is a detailed block diagram illustrating the receiver including an eye size measuring circuit in FIG. 1 according to an exemplary embodiment of the present invention.

The serializer/output-driver 350 in FIG. 1 or in FIG. 2 is omitted in FIG. 3. A buffer block 110 in FIG. 3 is disposed between the preamplifier/equalizer 100 and the first sampler 200 for buffering the output data of the preamplifier/equalizer 100 to provide the buffered data to the first sampler 200 and to a second sampler 410. Alternatively, however, the output data of the preamplifier/equalizer 100 may be provided to the first sampler 200 or the second sampler 410 directly not via the buffer block 110. Buffer units 111 and 113 included in the buffer block 110 may be identical to each other. The buffer block 110 may include only one buffer unit to provide an output of that one buffer to both the first sampler 200 and the second sampler 410.

The first sampler 200 includes a flip-flop I 210, a flip-flop Q 220, a flip-flop Ib 230 and a flip-flop Qb 240. The first sampler 200 samples the output data 101 of the preamplifier/equalizer 100 with respect to the recovered clock signals (I, Q, Ib, and Qb) 403 from a first phase interpolator 412 in the CDR 420 so as to output the sampled data (DI, DQ, DIb, and DQb) 201.

The CDR 420 includes a phase detector 422, a CDR loop filter 424, a phase interpolator (PI) 412, and a phase interpolation controller (PI controller) 426.

When a frequency of the received data signal 10 is f and the deserializer 300 executes deserialization with a conversion ratio of 1:n, frequencies of the reference clocks 411 from the PLL 416 may be presented as f/2 and frequencies of the multiple recovered clocks 403 may also be presented as f/2. The phase detector 422, the CDR loop filter 424, and the PI controller 426 may be operated at a clock frequency f/(2n).

The frequency f/2 is only for illustration purpose. The frequencies of the reference clocks 411 of the PLL 416 and the recovered clocks 403 are not restricted to the frequency f/2, and other frequencies such as f/4 and f/8 may be used as well.

The CDR circuit 420 recovers the clock signal and the data from the received data signal 10 through repetitive recovering processes in which the output of the CDR circuit 420 is fed back to the first sampler 200.

Figure 4:
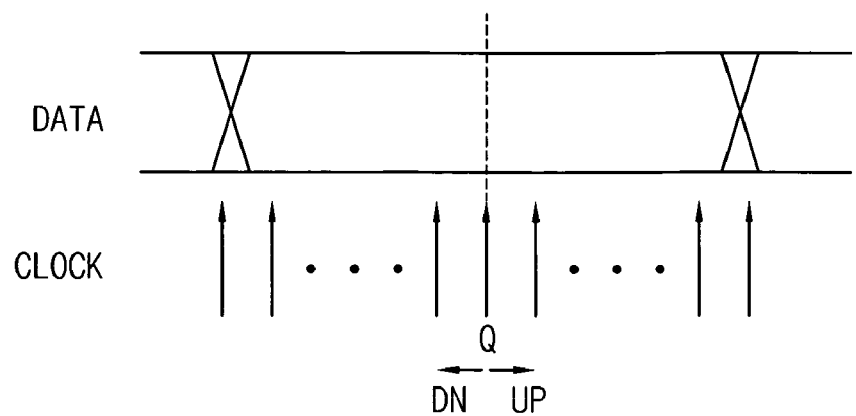
FIGS. 4 and 5 are conceptual diagrams illustrating operations of a phase detector of a clock data recovery (CDR) circuit in FIG. 3.
Figure 5:
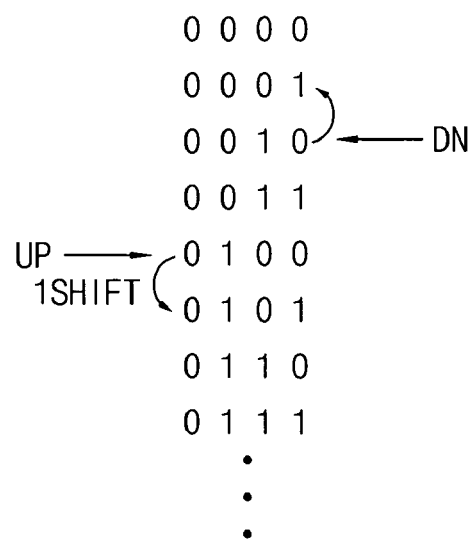
Figure 6:
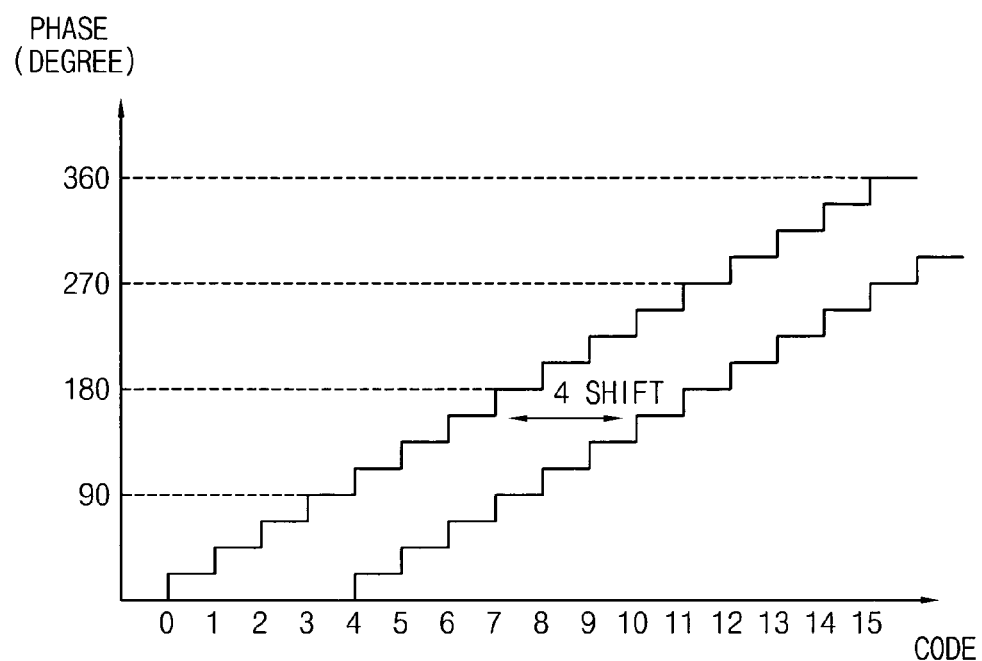
FIG. 6 is a graph showing a relationship between a digital code and phase of a clock signal.

Referring to FIGS. 4 through 6, the CDR circuit 420 operates the phase detector 422, the CDR loop filter 424, the PI controller 426, and the PI 412, so that the recovered clock Q and/or the recovered clock Qb from the first PI 412 can be placed at a center of a pulse of the data 201 or the data 301, according to exemplary embodiments.

The phase detector 422 detects a phase of the sampled data 201 outputted from the first sampler 200 or the deserialized data 301 outputted from the deserializer 300 to generate either an up signal or a down signal. For example, when the frequency of the received data signal 10 is f and the deserializer executes a deserialization with a conversion ratio of 1:n, the phase detector 422, the CDR loop filter 424 and the PI controller 426 may be operated at a frequency f/2 in the case of receiving the sampled data 201 from the first sampler 200, or at a frequency f/(2n) in the case of receiving the deserialized data 301 from the deserializer 300.

The CDR loop filter 424 generates an up command or a down command corresponding to the up signal or the down signal, respectively. The PI controller 426 generates a digital code 405 to control the first PI 412 in response to the up command or the down command.

The up command, as well as the down command, may be given as a one bit code, such that a bit value 1 indicates the up command and a bit value 0 indicates the down command. Furthermore, the digital code 405 may be given as a four-bit code, hence phases of the recovered clock signals from the first PI 412 can be adjusted by 22.5°, that is, 360°/16, using the digital code 405 that is changeable from 0000 to 1111.

As shown in FIG. 5, the PI controller 426 may increase the digital code by 1 (1 shift) when receiving the up command UP. On the other hand, the PI controller 426 may decrease the digital code by 1 when receiving the down command DN.

As shown in FIG. 6, when the digital code is shifted four times, the first PI 412 may increase or decrease the phases of the recovered clocks by 90°, that is, 22.5°×4.

Referring back to FIG. 3, the first PI 412 receives four clock signals having phases 0°, 90°, 180°, and 270°, respectively, from the PLL 416, and interpolates the four clock signals to generate the four recovered clock signals 403. The first PI 412 increases or decreases the phases of the four recovered clock signals 403 in response to the digital code 405 from the PI controller 426.

The eye size measuring circuit 400 includes the second sampler 410, an error counter 430, a shifted clock generator 440, and an eye size controller 450.

Figure 7:
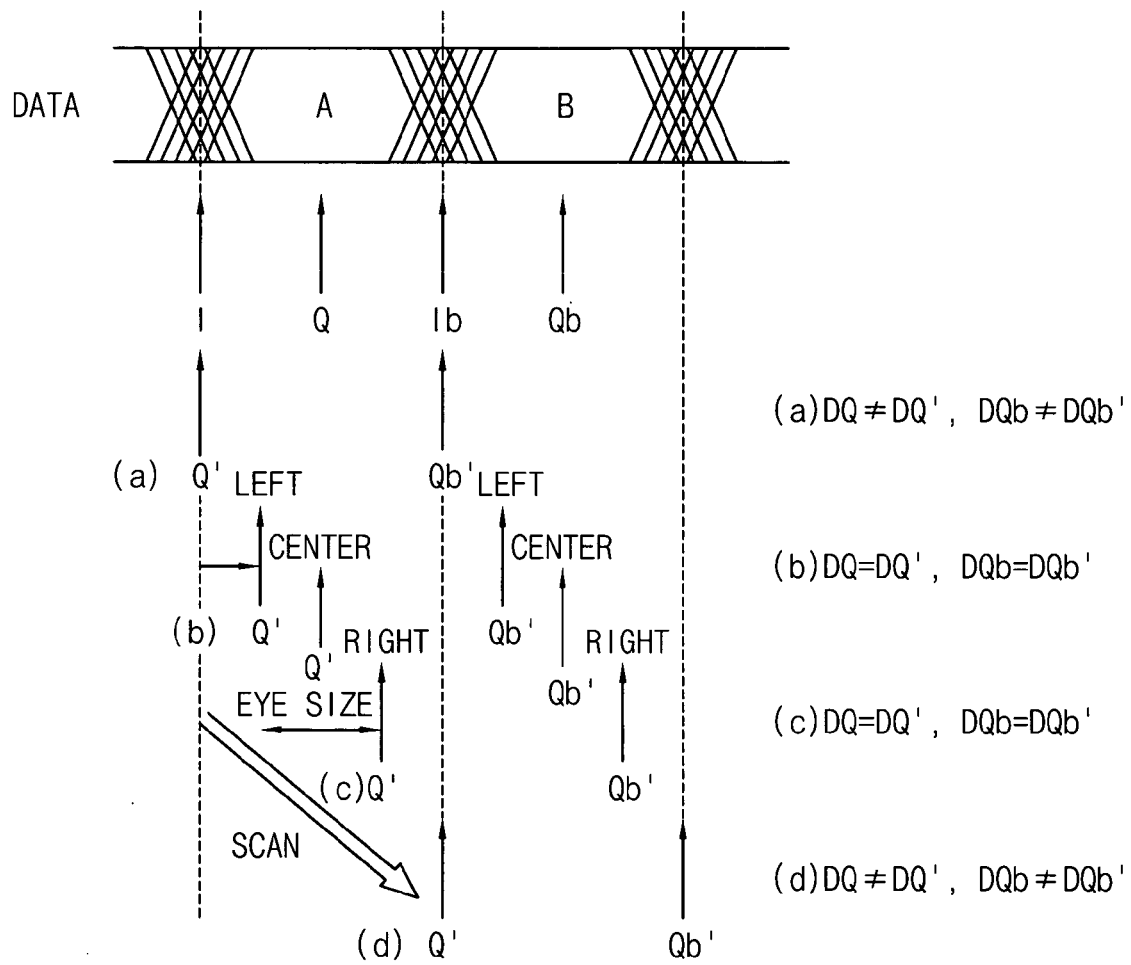
FIG. 7 is a conceptual diagram illustrating a method of measuring eye size according to an exemplary embodiment of the invention.

As represented in FIG. 7, the eye size measuring circuit 400 compares the sampled data DQ' and DQb' with the sampled data DQ and DQb. The sampled data DQ' and DQb' are sampled from the amplified data 101 of the preamplifier/equalizer 100 using the shifted clock signals Q' and Qb' of a second PI 442, while the sampled data DQ and DQb are sampled from the amplified data 101 of the preamplifier/equalizer 100 using the recovered clock signals Q and Qb of the first PI 412. Furthermore, the eye size measuring circuit 400 counts the number of errors, thereby deciding whether the sampled data DQ' is equal to the sampled data DQ and/or whether the sampled data DQb' is equal to the sampled data DQb. Hence, the eye size measuring circuit 400 estimates the eye size of the received data 10 based on the number of errors.

Additionally, the eye size measuring circuit 400 generates the control bit 401 for adjusting the equalizing strength of the preamplifier/equalizer 100 and provides the control bit 401 to the preamplifier/equalizer 100.

As shown in FIG. 3, shifted clock generator 440 includes a shifter 445 and the second PI 442.

The shifter 445 generates a digital code 407 by successively shifting bits of the digital code 405 outputted from the PI controller 426 in the CDR circuit 420. The digital code 407 is provided to the second PI 442 from the shifter 445. The digital code 407 has digital values corresponding to the digital code 405, and based on the digital values, phases of the output clock signals of the second PI 422 are shifted in a range from −180° to 180°.

The second PI 442 receives the digital code 407 and the reference clock signals 411 from the PLL 416 whose phases are respectively 0°, 90°, 180°, and 270°. Based on the received digital code 407 and the reference clock signals 411, the second PI 442 generates the phase-shifted clock signals (Q' and Qb') 409, which have gradually shifted phases within a maximum range of ±180° with respect to the recovered clock signals (I, Q, Ib, and Qb) 403 from the first PI 412 as illustrated in FIG. 7. That is, the shifter 445 and the second PI 442 together generate the phase-shifted clock signals (Q' and Qb') 409, which are shifted on the basis of the recovered clock signals from the CDR circuit 420. Therefore, the eye size may be measured without adverse influence caused by frequency offsets of the received data and/or of jitter in the received data signal.

As shown in FIG. 6 and FIG. 7, the phase-shifted clock signals (Q' and Qb') 409 are sequentially shifted from −180° to +180° with respect to the phases of the recovered clock signals (I, Q, Ib and Qb) 403 of the first PI 412. Therefore, the phase-shifted clock signals (Q' and Qb') 409 may be scanned for the entire phase range.

The second sampler 410 shown in FIG. 3 samples the amplified data 101 of the preamplifier/equalizer 100 or the output data of the buffer block 110 using the phase-shifted clock signals (Q' and Qb') 409 so as to output sampled data DQ' and DQb'.

The error counter 430 shown in FIG. 3 includes 1:2 demulitplexers 431, latches 433, a comparator 435 and a counter 437. The comparator 435 may be formed of exclusive-OR (XOR) gates.

The error counter 430 counts the number of errors by comparing the sampled data DQ and DQb of the first sampler 200 with the sampled data DQ' and DQb' of the second sampler 410.

As shown in FIG. 7, the error counter 430 decides whether the sampled data DQ and DQb, which are respectively synchronized with the recovered clock signals 0 and Ob at the center of the received data, are respectively identical to the sampled data DQ' and DQb'. As described above, the sample data DQ' and DQb' are respectively synchronized with the phase-shifted clock signals Q' and Qb', which are sequentially scanned from −180° to +180° with respect to the recovered clock signals Q and Qb.

Referring to FIG. 7, when the phase-shifted clock signal Q' has −180° phase (case (a)), or has +180° (case (d)) with respect to the recovered clock signal Q, the sampled data DQ' and DQb' corresponding to the phase-shifted clock signals Q' and Ob' may be different from the sampled data DQ and DQb corresponding to the recovered clock signals Q and Qb, respectively, since the sampled data DQ' and DQb' are placed within the jitter area of the received data.

When the phase-shifted clock signal Q' is placed in the left of the recovered clock signal Q (case (b)), that is, the phase-shifted clock signal Q' has a phase in a range between −180° and 0°, and at the same time the sampled data DQ' and DQb' corresponding to the phase-shifted clock signals Q' and Qb' are placed outside of the jitter area of the received data, the sampled data DQ and DQb corresponding to the recovered clock signals Q and Qb are respectively identical to the sampled data DQ' and DQb' corresponding to the phase-shifted clock signals Q' and Qb'.

Similarly, when the phase-shifted clock signal Q' is placed in the right of the recovered clock signal Q and Qb (case (c)), that is, the phase-shifted clock signals Q' has a phase in a range between 0° and +180°, and at the same time the sampled data DQ' and DQb' corresponding to the phase-shifted clock signals Q' and Qb' are placed outside of the jitter area of the received data, the sampled data DQ and DQb corresponding to the recovered clock signals Q and Qb are respectively identical to the sampled data DQ' and DQb' corresponding to the phase-shifted clock signals Q' and Qb'.

The sampled data DQ and DQ' are demultiplexed by the demultiplexer 431 with a ratio of 1:2, then latched by the latch 433 to be synchronized, and then inputted to one of the XOR gates. The XOR gate outputs 1 when the sampled data DQ and DQ' are identical to each other, but outputs 0 when the sampled data DQ and DQ' are different from each other.

Similarly, the sampled data DQb and DQb' are demultiplexed by the demultiplexer 431 with a ratio of 1:2, then latched by the latch 433 to be synchronized, and then inputted to the other XOR gate. The XOR gate outputs 1 when the sampled data DQb and DQb' are identical to each other, but outputs 0 when the sampled data DQb and DQb' are different from each other.

The 1:2 demultiplexer 431 is included in order to solve a possible timing limitation of the data comparison. Alternatively, a 1:4 demultiplexer as well as a 1:8 demultiplexer may be adapted for use.

Figure 8:
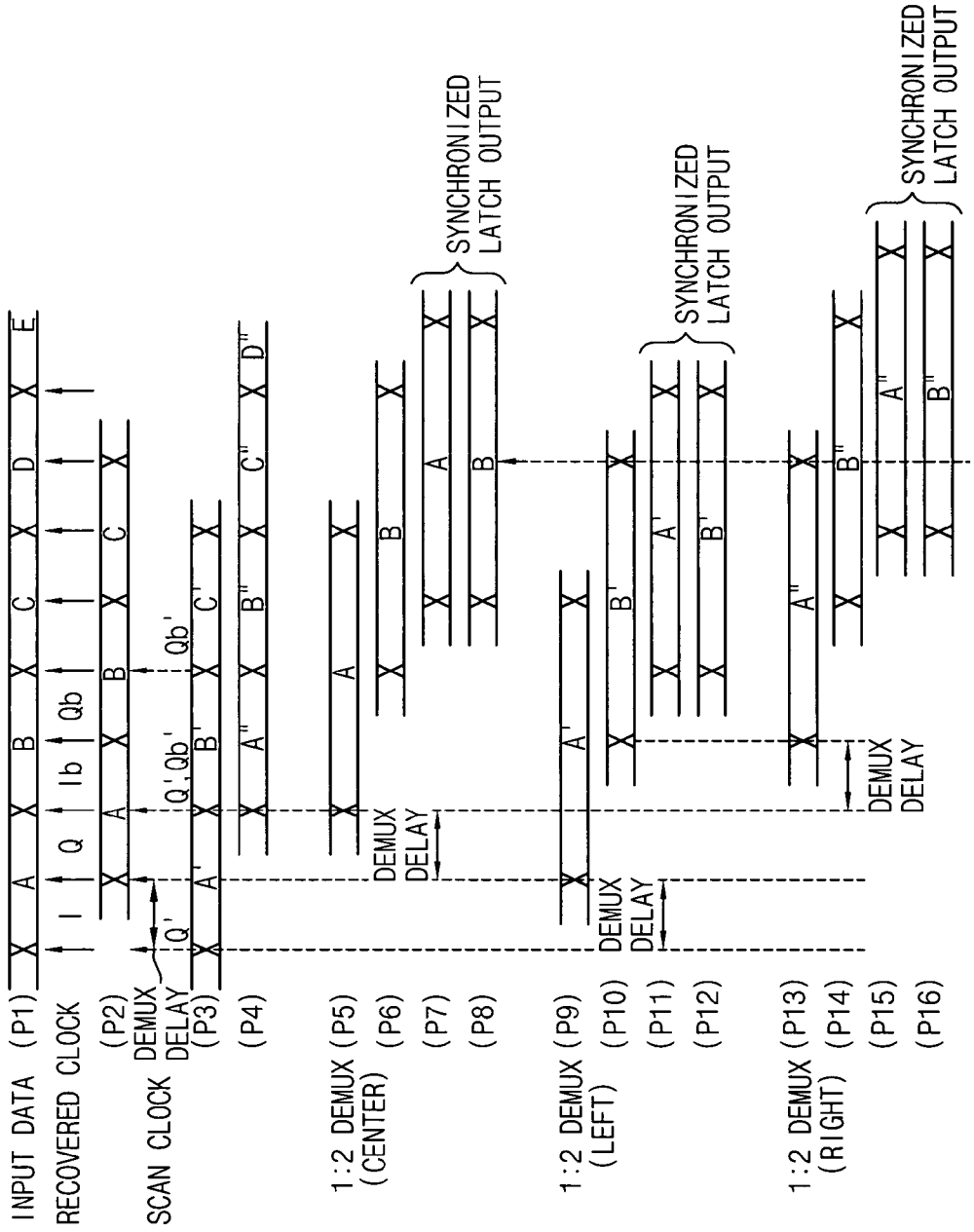
FIG. 8 is a timing diagram illustrating an eye size measurement of received data for successive phase shifts of a clock signal.

FIG. 8 is a timing diagram illustrating an eye size measurement of received data obtained when sequentially shifting the phase-shifted clock signals Q' and Qb'.

Referring to FIG. 8, the recovered clock signal Q is aligned by the CDR circuit 420 to the very center of data P1 that are provided to the first and second samplers 200 and 410. Output data of the first sampler 200 are delayed, as shown in data P2, for given delay times during passing the demultiplexers 431.

Data P3 correspond to a case when the phase-shifted clock signal Q' is placed at −180° phase with respect to the recovered clock signal Q, while data P4 correspond to a case when the phase-shifted clock signal Qb' is placed at −180° phase with respect to the recovered clock signal Qb'.

When the phase-shifted clock signals Q' and Ob' are respectively placed at the center of the recovered clock signals Q and Qb, the sampled data DQ' and DQb' of the second sampler 410 are demulitplexed with a ratio of 1:2 and simultaneously delayed for given delay times, as shown in data P5 and P6 in FIG. 8, which are passing through the 1:2 demultiplexers in the error counter 430. After being synchronized by the latches, the sampled data DQ' and Dab' are synchronously outputted from the latches as data P7 and P8 as shown in FIG. 8.

Similarly, when the phase-shifted clock signals Q' and Qb' are respectively placed to the left of the recovered clock signals Q and Qb, the sampled data DQ' and DQb' of the second sampler 410 are demulitplexed with a ratio of 1:2 and simultaneously delayed for given delay times, as shown in data P9 and P10, which are passing through the 1:2 demultiplexers. After being synchronized by the latches, the sampled data DQ' and DQb' are synchronously outputted from the latches at the same time, as shown in data P11 and P12.

When the phase-shifted clock signals Q' and Qb' are respectively placed to the right of the recovered clock signals Q and Qb, the sampled data DQ' and DQb' of the second sampler 410 are demulitplexed with a ratio of 1:2 and simultaneously delayed for given delay times, as shown in P13 and P14, which are passing through the 1:2 demultiplexers. After being synchronized by the latches, the sampled data DQ' and DQb' are outputted from the latches at the same time, as shown in data P15 and P16 of FIG. 8.

FIG. 9 is a table illustrating a relationship between the error count and the digital code for shifting a recovered clock signal.

The values of the error count in FIG. 9 are obtained by summing the output of the XOR gates in FIG. 3, while the digital code 405 is sequentially shifted so as to sequentially shift the phase-shifted clock signals Q' and Qb'.

For example, when the digital code is zero, for example, '0000', the phases of the corresponding phase-shifted clock signals Q' and Qb' are respectively −180° with respect to the recovered clock signals Q and Qb, and thus the error count is 32. When the digital code is 1, e.g., '0001', the phases of the corresponding phase-shifted clock signals Q' and Qb' are respectively −167.5° with respect to the recovered clock signals Q and Qb, and the error count is 21. When the digital code is from 3 to 12, for example, from '0011' to '1100,' the phases of the corresponding phase-shifted clock signals Q' and Qb' are respectively within a range of from −112.5° to +112.5° with respect to the recovered clock signals Q and Qb, and the error count is 0. A phase range, in which the error count is zero, indicates the eye size of the received data. In this example, the digital codes 405 with which all of the error counts are zero, is in the range of from 3 to 12, that is, from −112.5° to +112.5°. Hence, the phase range 225° is the eye size of the received data.

Referring back to FIG. 3, the eye size controller 450 is provided with the error count 451 from the error counter 430, and it calculates the eye size of the received data signal 10. Then the eye size controller 450 decides the equalizer control bit 401 for adjusting the equalizing strength of the preamplifier/equalizer 100 according to the calculated eye size. The eye size controller 450 provides the equalizer control bit 401 to the preamplifier/equalizer 100.

FIG. 10 is a table illustrating a relationship among the error count, the eye size, the equalizer control bit and the digital code for shifting the recovered clock signals.

The eye size controller 450 in FIG. 3 provides the preamplifier/equalizer 100 with one of the equalizer control bits 00, 01, 10, and 11, and measures the eye sizes depending on the equalizer control bits.

Measuring the error count may be repeated as necessary, for example, 50 times for every one digital code, represented at the column DIGITAL CODE in FIG. 10. For example, in FIG. 10, when the equalizer control bit represented at the column EQ CONTROL BIT in FIG. 10, is 00 and the digital code is 0, the error count scores 10 out of 50 times. When the equalizer control bit is 00 and the digital code is 2, the error count scores 0 out of 50 times. The eye size may be obtained by counting the number of successive error counts having a value 0.

The eye size controller 450 may store the measured eye size to a register (not shown). The register may store the digital codes, the error counts, and the equalizer control bits, as well. The register may be included in the eye size controller 450 or in any other of the components of the system.

As shown in FIG. 10, the eye size is measured as 8 for the equalizer control bit 00, the eye size is 14 for the equalizer control bit 01, the eye size is 12 for the equalizer control bit 10, and the eye size is 6 for the equalizer control bit 11. The eye size has its largest value for the equalizer control bit 01, wherein the eye size 1 with the 4-bit digital code represents a 22.5° phase difference.

Therefore, the eye size controller 450 sets the equalizer control bit to '01' so as to obtain the largest eye size. An adaptive equalizer may be implemented in such a way that controls the preamplifier/equalizer 100 to obtain the largest eye size.

Procedures for adjusting a gain of the equalizer using the equalizer control bits are described as follows with reference to FIGS. 11, 12 and 13,.

Figure 11:
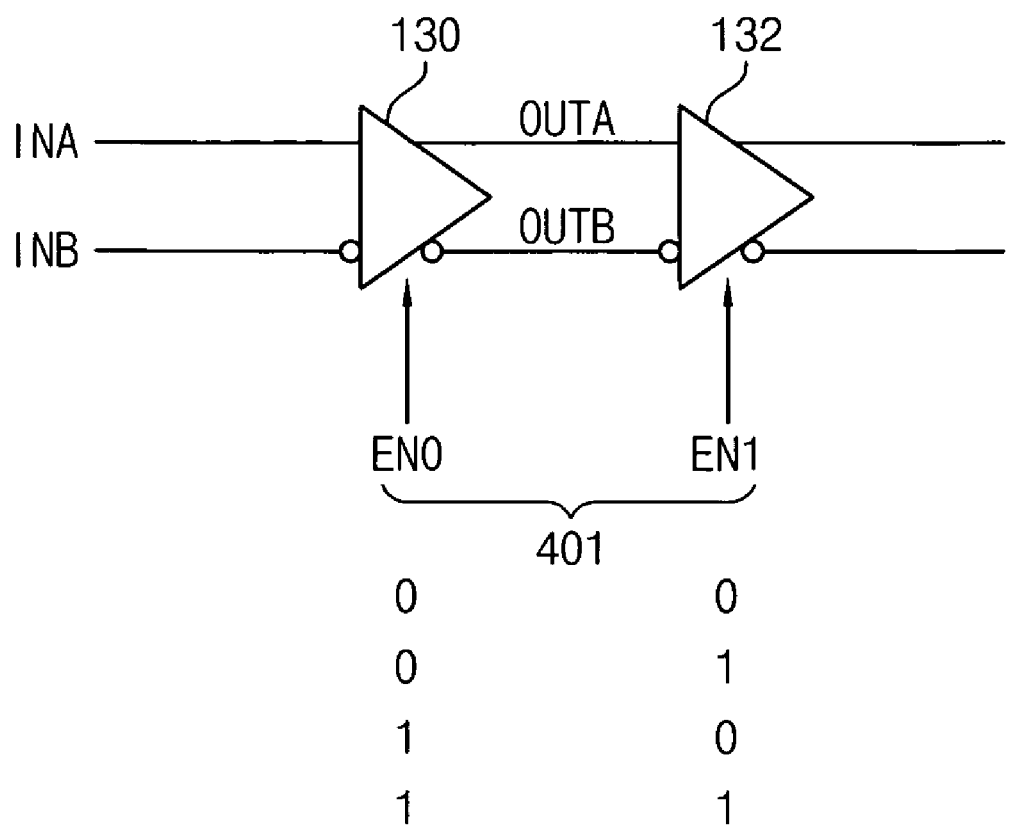
FIG. 11 is a circuit diagram illustrating a two-stage equalizer according to an exemplary embodiment of the invention.

FIG. 11 is a diagram illustrating a two-stage equalizer according to an exemplary embodiment of the invention. FIG. 12 is a circuit diagram illustrating a first stage of the two-stage equalizer shown in FIG. 11. FIG. 13 is a graph showing adjusted gains of the equalizer in FIG. 12 using the equalizer control bit. In FIG. 11, the two-stage equalizer is shown, however, an equalizer having multiple stages more than two may also be used.

Referring to FIG. 11, an equalizer 130 receives an equalizer control bit value EN0 at a control input terminal thereof, and an equalizer 132 receives an equalizer control bit value EN1 at its control input terminal.

Figure 12:
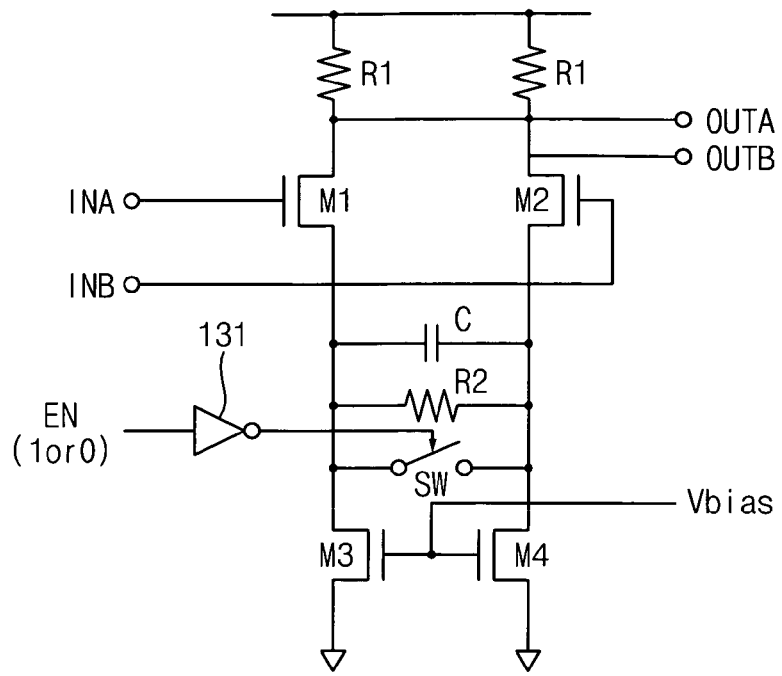
FIG. 12 is a circuit diagram illustrating a first stage of the two-stage equalizer in FIG. 11.

Referring to FIG. 12, when the equalizer control bit value EN0 is set to 0, an output of an inverter 131 is a logic 'high,' and a switch SW is turned on or closed. Consequently, an equalizing function of the equalizer is deactivated, that is, the equalizing strength is set to 0.

When the equalizer control bit value EN0 is set to 1, the output of the inverter 131 is turned to a logic 'low,' and the switch SW is turned off or opened. Consequently, the equalizer 130 operates as an amplifier and the equalizing function, which amplifies a high-frequency input signal via a signal path including a capacitor C, is activated. Therefore, the gain of the equalizer may be adaptively adjustable and may be set to an optimal value corresponding to the equalizer control bit of the largest eye size.

Figure 13:
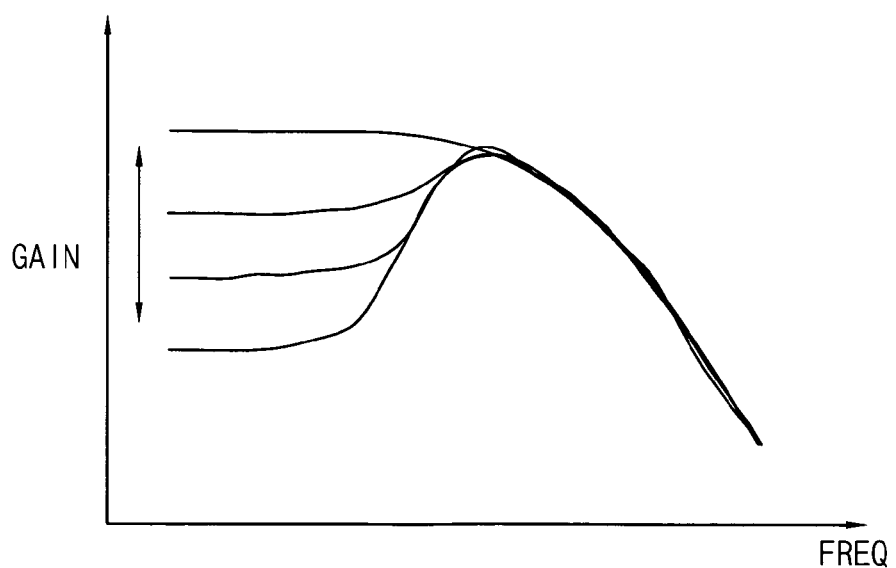
FIG. 13 is a graph showing f gains of the equalizer in FIG. 12, adjusted using an equalizer control bit.

Various gains of the equalizer versus frequency, which relates to eye size, are shown in FIG. 13.

Figure 14:
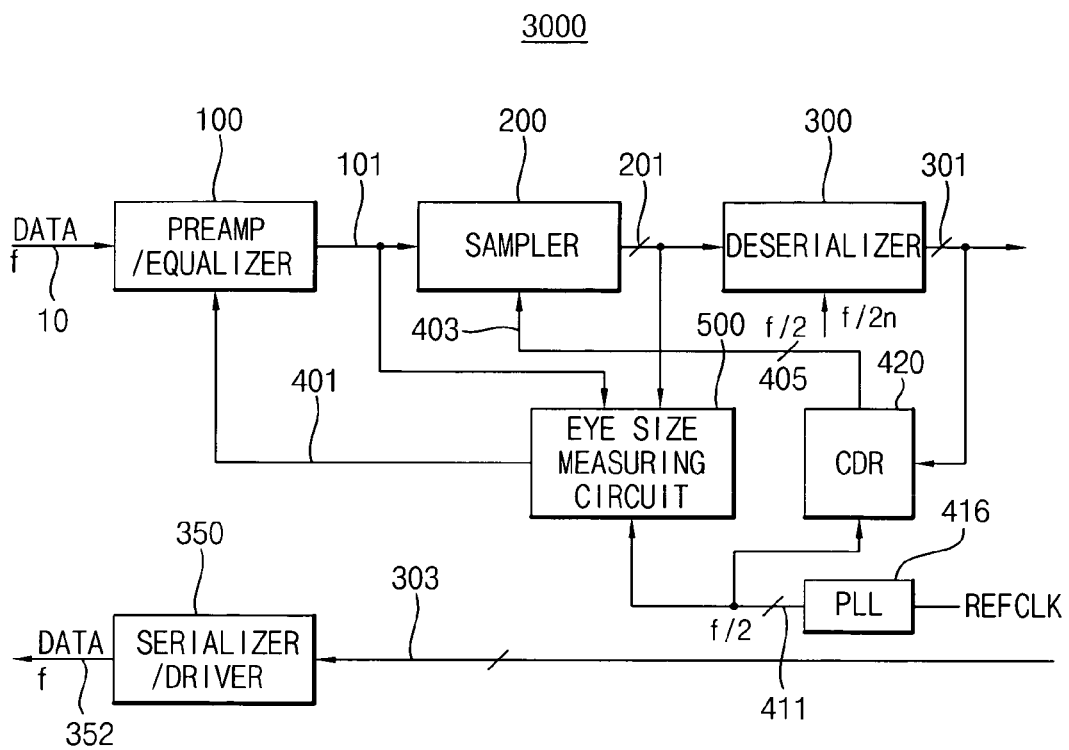
FIG. 14 is a block diagram illustrating a receiver of a digital data communication system according to an exemplary embodiment of the invention.

FIG. 14 is a block diagram illustrating a receiver of a digital data communication system according to an exemplary embodiment of the invention.

The receiver in FIG. 14 generates phase-shifted clock signals Q' and Qb', which are obtained based on clock signal 411 that is shifted from the reference clock signal REFCLK through the PLL 416 by a given phase, instead of using the clock signals recovered by the CDR circuit 420, as in the receiver in FIG. 3.

Figure 15:
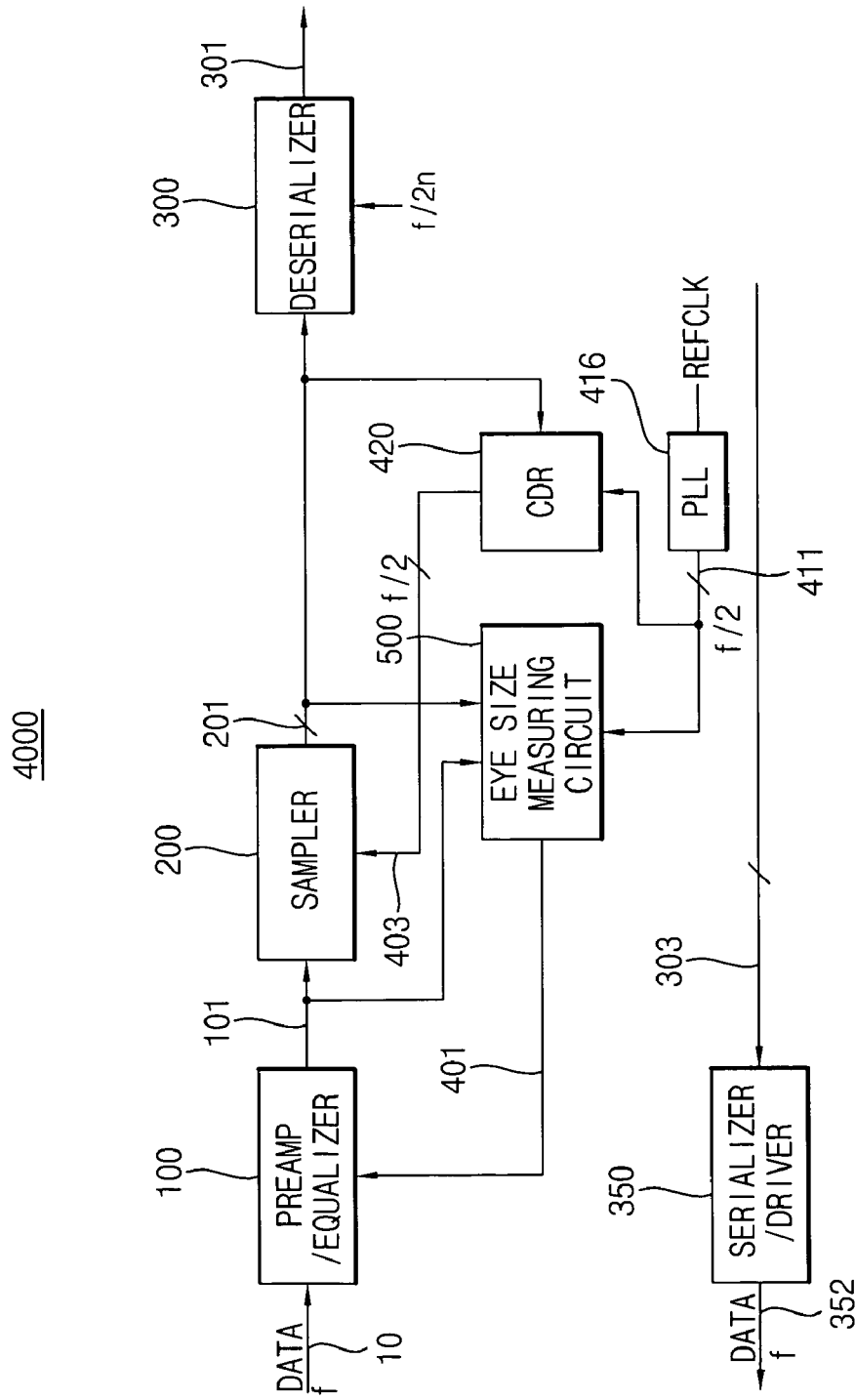
FIG. 15 is a block diagram illustrating a receiver of a data communication system including a serializer-deserializer according to an exemplary embodiment of the invention.

FIG. 15 is a block diagram illustrating a receiver of a data communication system including a serializer-deserializer according to an exemplary embodiment of the present invention.

The CDR circuit 420 of FIG. 15 extracts the multiple recovered clocks signals 403 from the received data 10 based on the sampled data 201 from the first sampler 200, instead of the deserialized data 301 from the deserializer 300 as was shown in FIG. 14.

Figure 16:
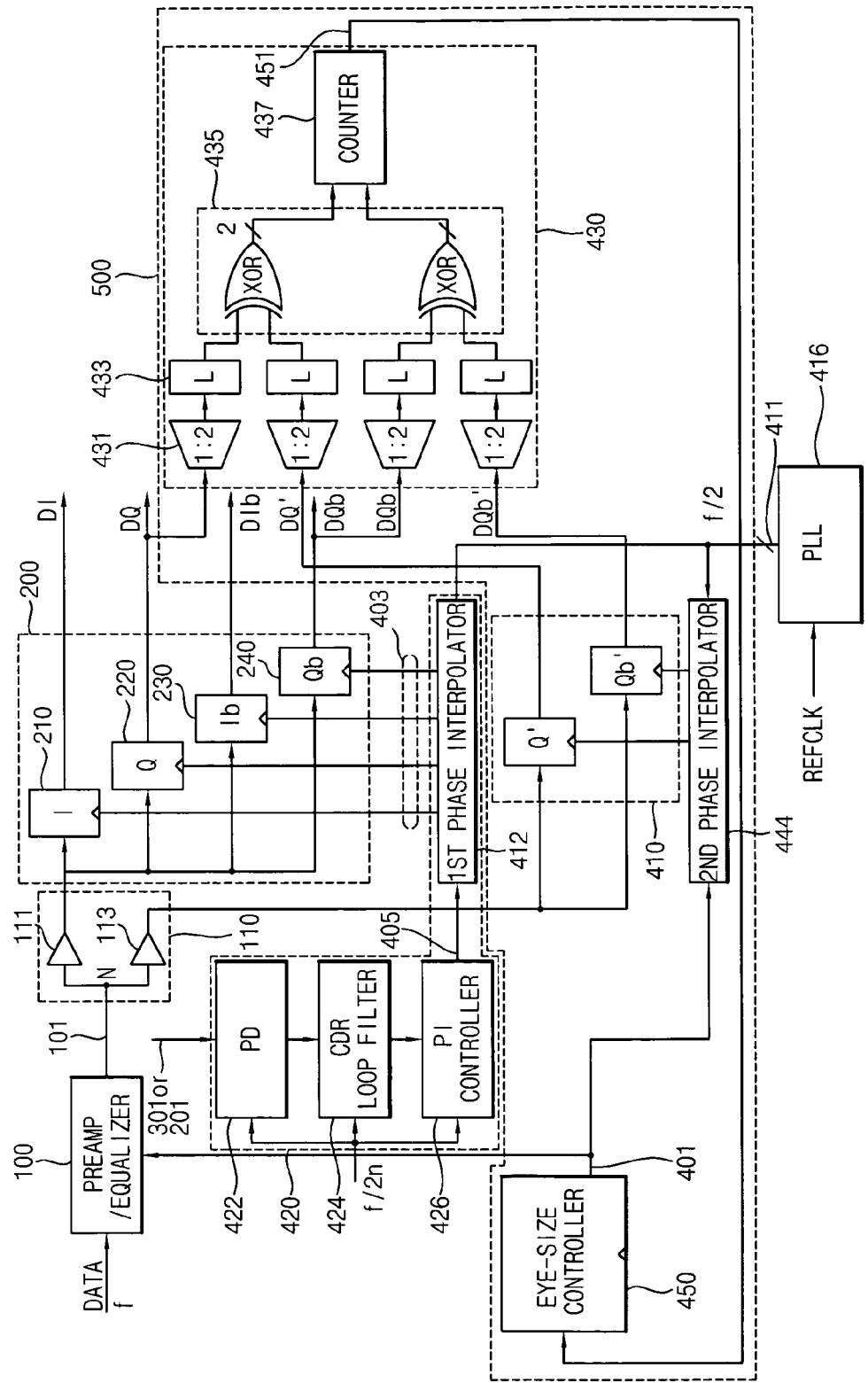
FIG. 16 is a detailed block diagram illustrating the receiver including an eye size measuring circuit in FIG. 14 according to an exemplary embodiment of the invention.

FIG. 16 is a detailed block diagram illustrating the receiver including an eye size measuring circuit as shown in FIG. 14 according to exemplary embodiments of the present invention.

The receiver in FIG. 16 has substantially the same configuration as the receiver shown in FIG. 3, except configuration of the eye size measuring circuit 500 is different from that of the eye size measuring circuit 400 in FIG. 3.

The eye size measuring circuit 500 in FIG. 16 generates phase-shifted 15 clock signals Q' and Qb', which are obtained by the second PI 444 based on clock signal 411 that is shifted from the reference clock signal REFCLK through the PLL 416 by a given phase instead of using the digital code 405 from the CDR circuit 420, as in the receiver shown in FIG. 3.

The second PI 444 receives the equalizer control bit from the eye size controller 450 and initiates shifting the phase-shifted clock signals whenever the equalizer control bit is changed.

The CDR circuit 420 may generate the recovered clock signal 403 from the received data 10 using the sampled data 201 of the first sampler 200, as shown in FIG. 15, instead of from the sampled data 301 of the deserializer 300.

FIGS. 17 through 20 are detailed block diagrams respectively illustrating different eye size measuring circuits according to exemplary embodiments of the invention.

Eye size measuring circuits as shown in FIGS. 17 through 20 have substantially the same configurations as the eye size measuring circuits shown in FIGS. 3 and 16 except that the configurations of the second samplers and error counters are different from those of the second samplers and the error counters shown in FIGS. 3 and 16.

Figure 17:
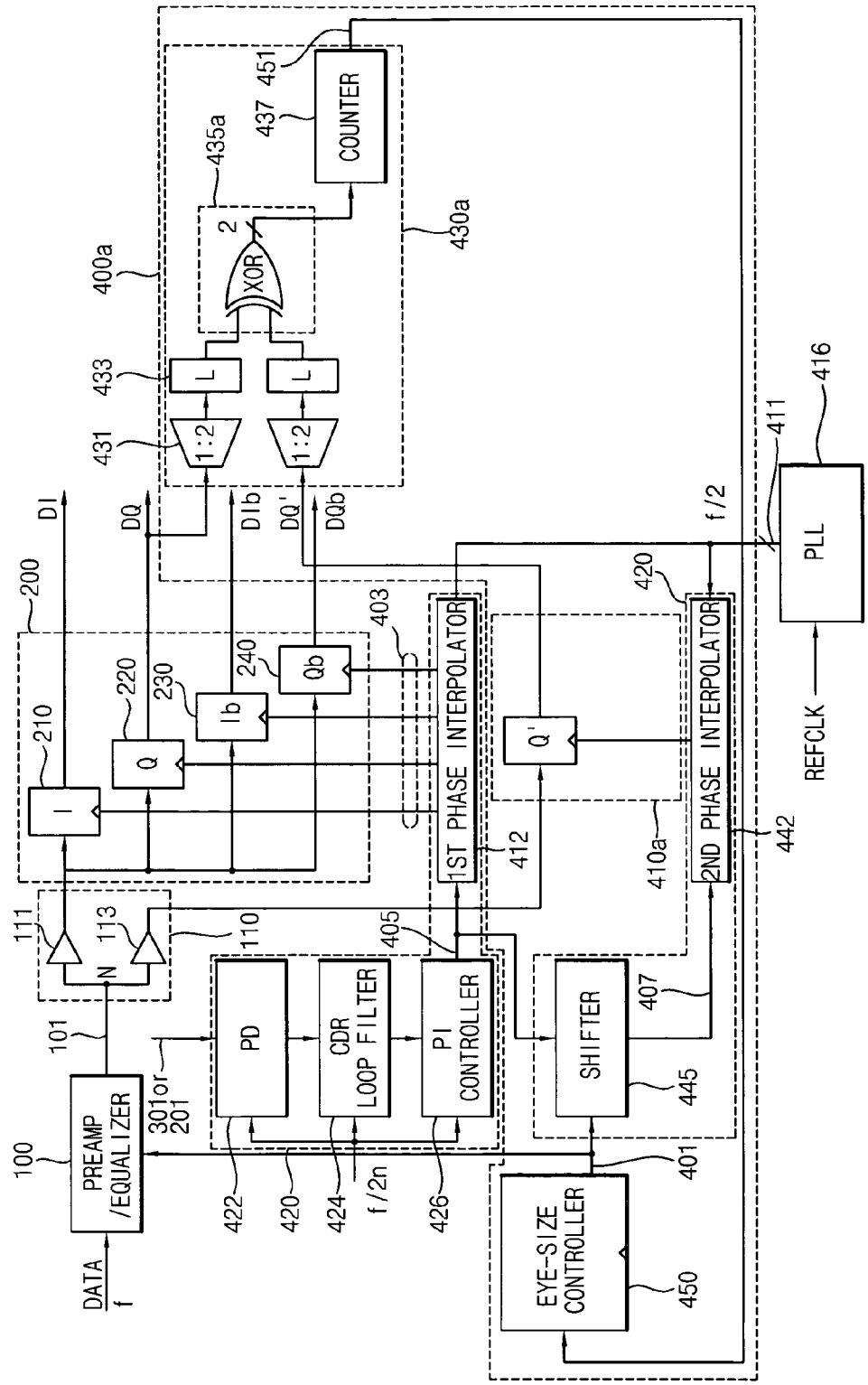
FIGS. 17 through 20 are detailed block diagrams respectively illustrating different eye size measuring circuits according to exemplary embodiments of the invention.

The eye size measuring circuit 400a shown in FIG. 17 includes a second sampler 410a which includes only one Q' flip-flop 411 and the error counter 430a, which scans only the phase-shifted clock signal Q' and compares the sampled data DQ with the sampled data DQ' to count the errors, unlike the eye size measuring circuit 400 in FIG. 3.

Figure 18:
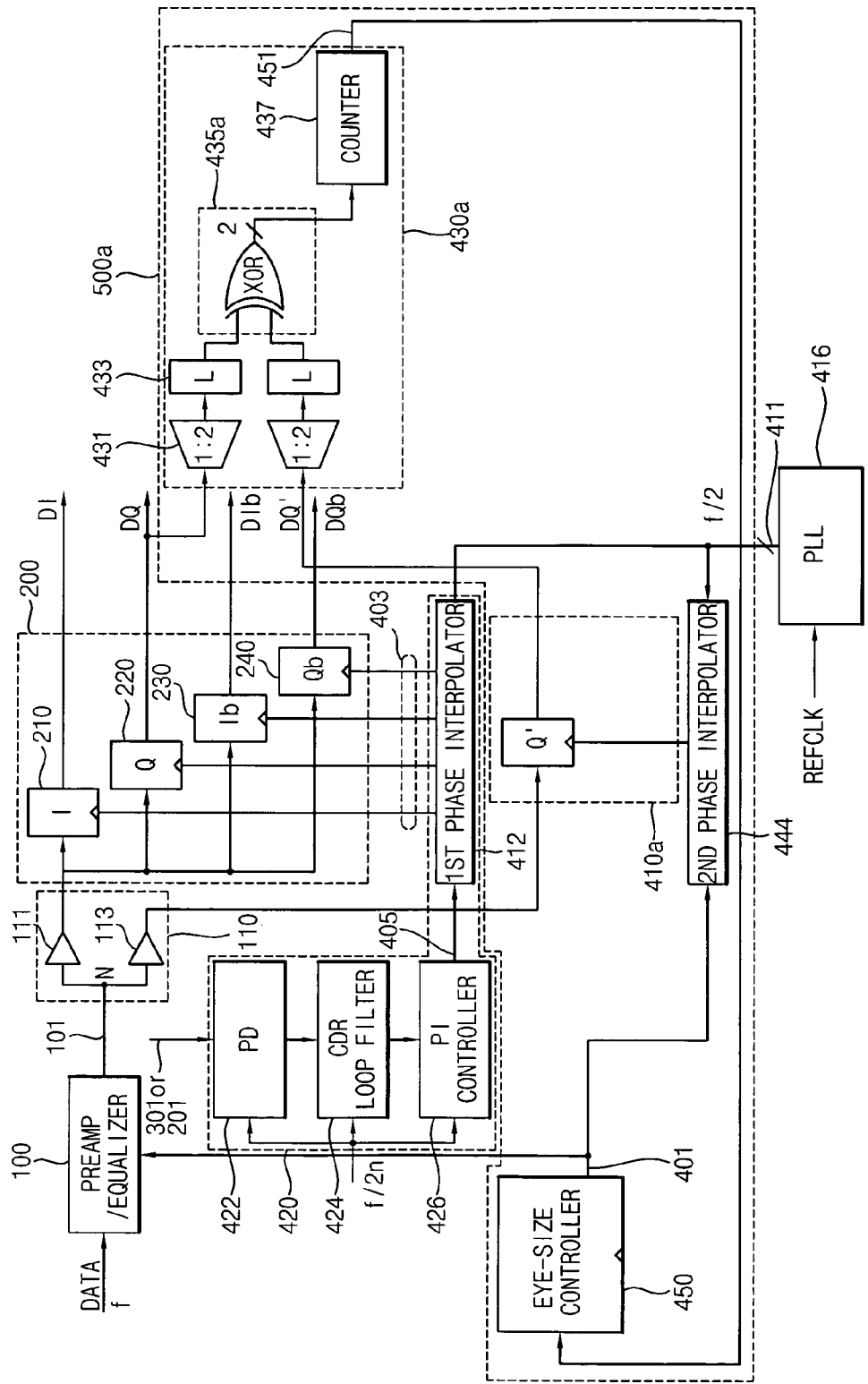

The eye size measuring circuit 500a shown in FIG. 18 includes a second sampler 410a which is composed of only one Q' flip-flop 411 and the error counter 430a, which scans only the phase-shifted clock signal Q' compares the sampled data DQ with the sampled data DQ' to count the errors, unlike the eye size measuring circuit 500 shown in FIG. 16.

Figure 19:
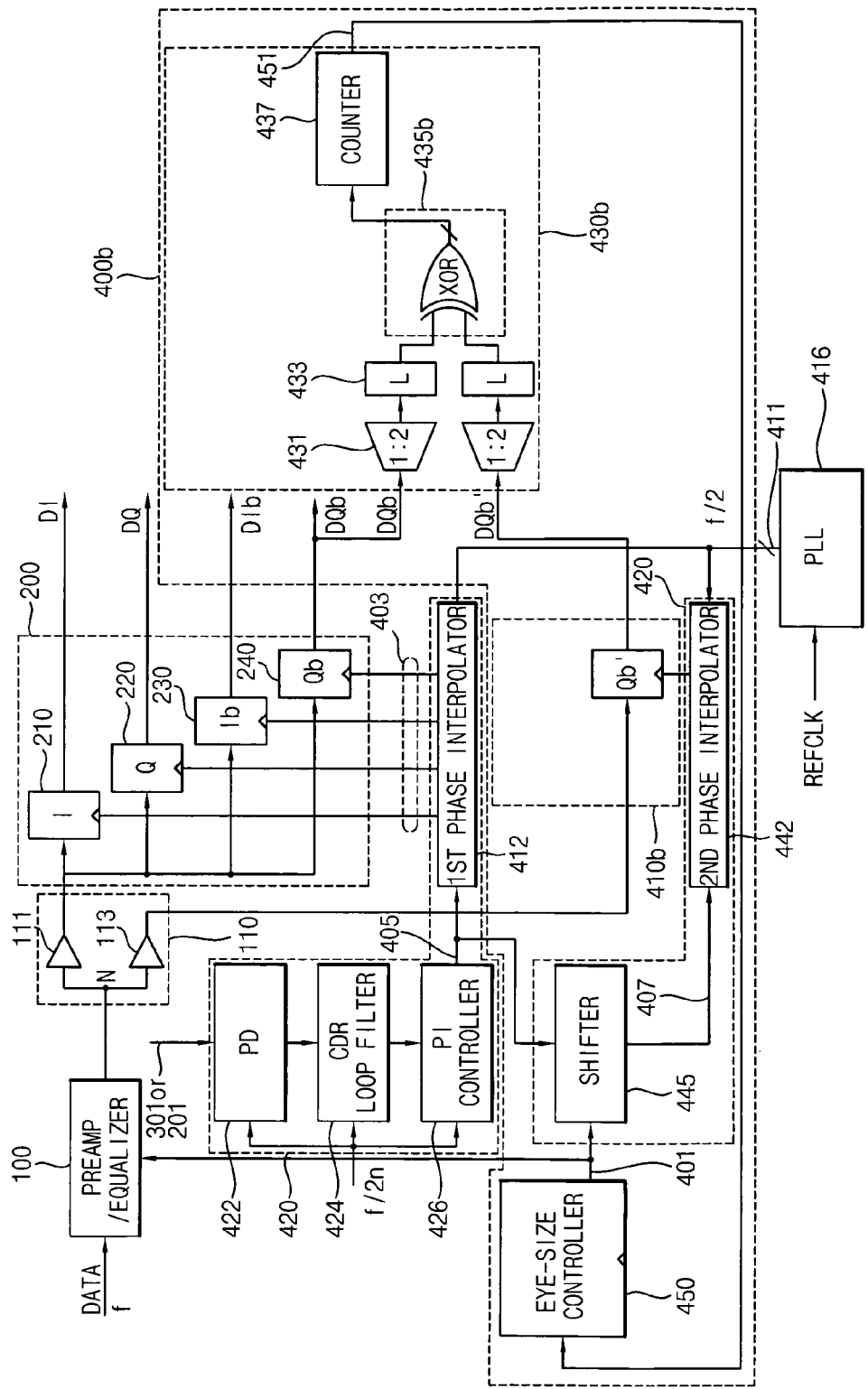

The eye size measuring circuit 400b shown in FIG. 19 includes a second sampler 410b, which is composed of only one Qb' flip-flop 413 and the error counter 430b, which scans only the phase-shifted clock signal Qb' and compares the sampled data DQ with the sampled data DQ' to count the errors, unlike the eye size measuring circuit 400 shown in FIG. 3.

Figure 20:
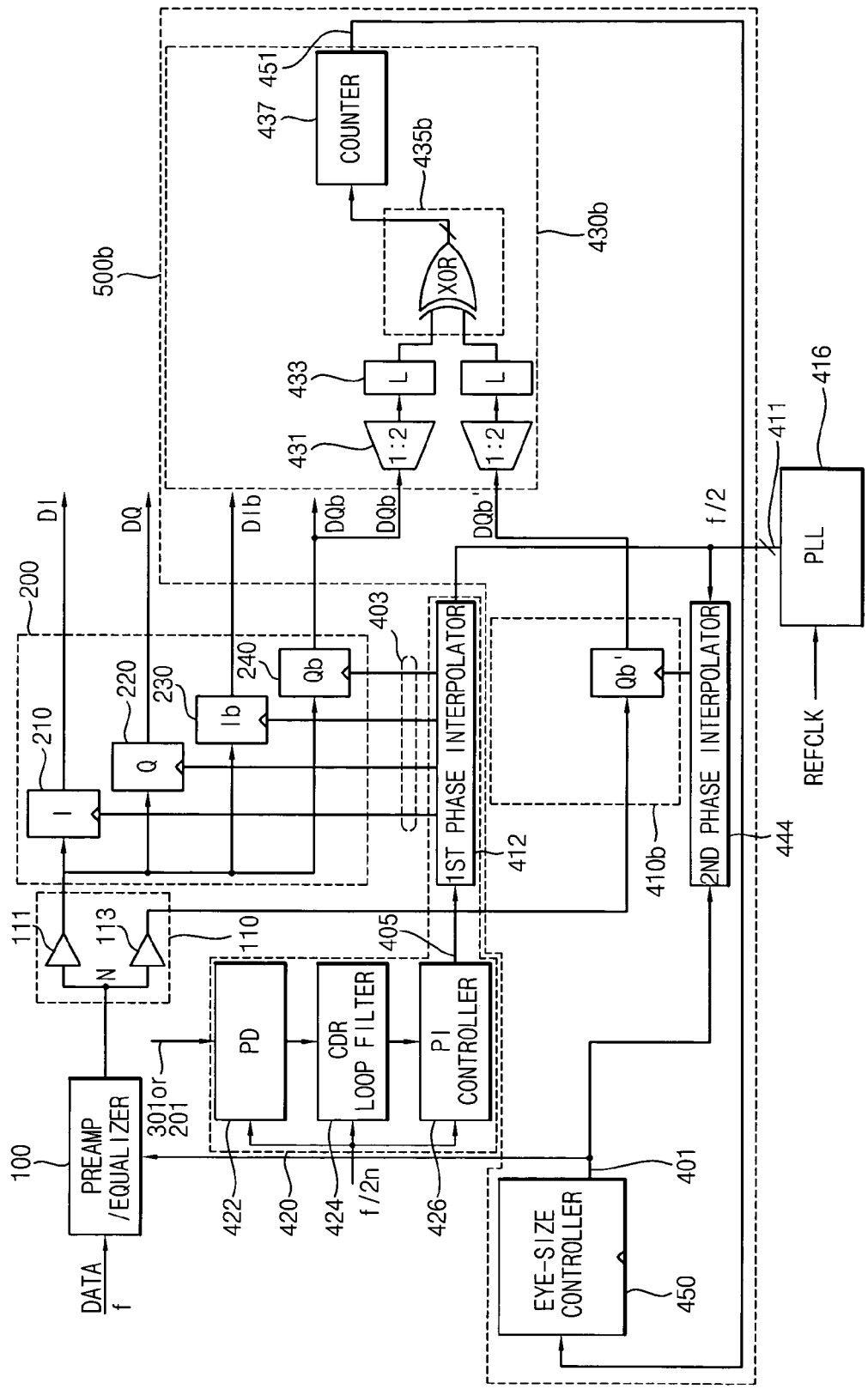

The eye size measuring circuit 500b shown in FIG. 20 includes a second sampler 410b, which is composed of only one Qb' flip-flop 413, and the error counter 430b, which scans only the phase-shifted clock signal Qb' and compares the sampled data DQ with the sampled data DQ' to count the errors, unlike the eye size measuring circuit 500 shown in FIG. 16.

The eye size measuring circuits according to the exemplary embodiments of the present invention may be adapted to a receiver of a data communication system including a sampler and a CDR circuit. For example, the eye size measuring circuits according to the exemplary embodiments of the present invention may be adapted to a receiver of a data communication system including a serializer-deserializer.

The eye size measuring circuits according to the exemplary embodiments of the present invention, however, are not limited to a receiver of a data communication system including a serializer-deserializer. The eye size measuring circuits according to the exemplary embodiments of the present invention may be adapted to a receiver of a data communication system including a sampler and a CDR circuit, even though the receiver does not include a serializer and/or a deserializer.

According to the exemplary embodiments of the present invention, the eye size measuring circuits, the receivers of data communication systems, and the methods of measuring the eye size generate first sampled data by performing a first sampling of received data by recovered clock signals that are recovered from the received data by the CDR circuit and generate second sampled data by performing a second sampling of the received data by using phase-shifted clock signals, which are shifted from the recovered clock signals by given phases. Error counting is repeatedly performing a comparison of the first and second sampled data and the eye size is measured by obtaining a phase range where the error count is 0. Therefore, the eye size may be measured without adverse influences of frequency offsets and/or jitter of the received data signal.

Furthermore, an adaptive equalizing may be achieved by adjusting an equalizing strength of the equalizer based on equalizer control bits at the time when the measured eye size is maximized.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A circuit for measuring an eye size comprising:
a sampler configured to generate first sampled data by sampling received data based upon at least one shifted clock signal, the at least one shifted clock signal being obtained by shifting each phase of at least one of recovered clock signals by respectively predetermined phases, the recovered clock signals having phases different from each other and being recovered from the received data in response to a digital code;
an error counter configured to generate an error count for calculating the eye size of the received data by comparing the first sampled data with second sampled data, the second sampled data being obtained by sampling the received data based upon the at least one of the recovered clock signals; and
a shifted clock signal generator configured to sequentially shift the digital code to generate a shifted digital code and configured to generate the at least one shifted clock signal in response to the shifted digital code,
wherein each value of the error count is obtained by summing the comparison result of the first sampled data and the second sampled data with respect to each value of the shifted digital code.

2. The circuit of claim 1, wherein the received data are serial data that is equalized before being sampled.

3. The circuit of claim 1, wherein the second sampled data are sampled from the received data by aligning the at least one of the recovered clock signals to a center between the edges of the received data.

4. The circuit of claim 1, wherein a frequency of the recovered clock signals and the shifted clock signals is substantially half a frequency of the received data.

5. The circuit of claim 4, wherein the shifted clock signals are obtained by shifting the at least one of the recovered clock signals by the predetermined phases which are in a range from −180° to +180°.

6. The circuit of claim 1, wherein the error counter generates the error count by counting the number of times that the first sampled data are different from the second sampled data that are obtained by comparing the first sampled data with the second sampled data.

7. The circuit of claim 6, wherein the error counter generates the error count by calculating values that are obtained by performing exclusive OR (XOR) operations on the first sampled data and the second sampled data 8. The circuit of claim 1, wherein the shifted clock signal generator comprises a shifter configured to sequentially shift bits of the digital code to generate the shifted digital code corresponding to the predetermined phases.

9. The circuit of claim 8, wherein the shifted clock signal generator further comprises:
a phase-locked loop configured to generate a plurality of clock signals based upon a reference clock; and
a phase interpolator configured to generate the at least one shifted clock signal based upon the shifted digital code and the plurality of the clock signals provided from the phase-locked loop.

10. The circuit of claim 1, wherein the error counter comprises:
a first demultiplexer for demultiplexing the first sampled data; and
a second demultiplexer for demultiplexing the second sampled data.

11. The circuit of claim 10, wherein the error counter further comprises:
a first latch for latching an output of the first demultiplexer; and
a second latch for latching an output of the second demultiplexer in synchronization with the first latch.

12. The circuit of claim 11, wherein the error counter further comprises an exclusive OR (XOR) logic gate performing an XOR operation on outputs of the first and second latches.

13. The circuit of claim 12, wherein the error counter further comprises a counter for counting an output of the XOR logic gate.

14. The circuit of claim 1, further comprising an eye size controller configured to calculate the eye size based upon the error count and to generate an equalizer control bit for adjusting an equalizing strength applied to the input data.

15. A receiver of a data communication system, the receiver comprising:
a clock data recovery (CDR) circuit for generating a plurality of recovered clock signals, the recovered clock signals having different respective phases and being recovered from received data in response to a digital code;
a first sampler configured to generate first sampled data by sampling the received data based upon at least one of the recovered clock signals; and
an eye size measuring circuit configured to measure an eye size by comparing the first sampled data with second sampled data, the second sampled data being obtained by sampling the received data based upon at least one phase shifted clock signal, the at least one phase shifted clock signal being obtained by shifting each phase of the at least one of the recovered clock signals by respective predetermined phases, the eye size measuring circuit comprising,
a shifted clock signal generator configured to sequentially shift the digital code to generate a shifted digital code and configured to generate the at least one phase shifted clock signal in response to the shifted digital code;
a second sampler to generate the second sampled data by sampling the received data based upon the at least one phase shifted clock signal; and
an error counter configured to generate an error count by comparing the first sampled data with the second sampled data, wherein each value of the error count is obtained by summing the comparison result of the first sampled data and the second sampled data with respect to each value of the shifted digital code.

16. The receiver of claim 15, wherein the received data are serial data that are equalized before being sampled.

17. The receiver of claim 15, wherein the shifted clock signal generator comprises a shifter configured to sequentially shift bits of the digital code to generate the shifted digital code corresponding to the predetermined phases.

18. The receiver of claim 17, wherein the shifted clock signal generator further comprises:
a phase-locked loop generating a plurality of clock signals based upon a reference clock signal fed thereto; and
a phase interpolator generating the phase shifted clock signals based upon the shifted digital code and the plurality of the clock signals provided from the phase-locked loop.

19. The receiver of claim 15, wherein the eye size measuring circuit further comprises an eye size controller configured to calculate the eye size based upon the error count, and configured to generate equalizer control bit for adjusting an equalizing strength.

20. The receiver of claim 15, further comprising a deserializer for deserializing the first sampled data received from the first sampler.

21. The receiver of claim 15, further comprising a serializer/output-driver for serializing and amplifying data to be transmitted.

22. A method of measuring an eye size comprising:
generating first sampled data by sampling received data based upon at least one of recovered clock signals, the recovered clock signals having different respective phases and being recovered from the received data in response to a digital code;
sequentially shifting the digital code to generate a shifted digital code provided by a clock generator;
shifting each phase of at least one of the recovered clock signals by respectively predetermined phases in response to the shifted digital code to generate at least one shifted clock signal;
generating second sampled data by sampling the received data based upon at least one shifted clock signal; and
generating an error count for calculating the eye size of the received data by comparing the first sampled data with the second sampled data, wherein each value of the error count is obtained by summing the comparison result of the first sampled data and the second sampled data with respect to each value of the shifted digital code.

23. The method of claim 22, wherein the received data are serial data that are equalized before sampling the received data.

24. The method of claim 22, wherein the first sampled data are sampled from the received data by aligning the at least one of the recovered clock signals to a center between the edges of the received data 25. The method of claim 22, wherein the error counter generates the error count by counting the number of times that the first sampled data are different from the second sampled data by comparing the first sampled data with the second sampled data.

26. The method of claim 22, further comprising calculating the eye size by repeatedly shifting, for predetermined times, each phase of the at least one of the recovered clock signals by the respectively predetermined phases.

27. The method of 26, further comprising generating an equalizer control bit for adjusting an equalizing strength applied to the received data.

* * * * *